Sept. 16, 1930.　　　H. W. BUHLER　　　1,775,668
TRIMMING FOR AUTOMOBILES, FURNITURE, AND THE LIKE
Filed Jan. 24, 1927
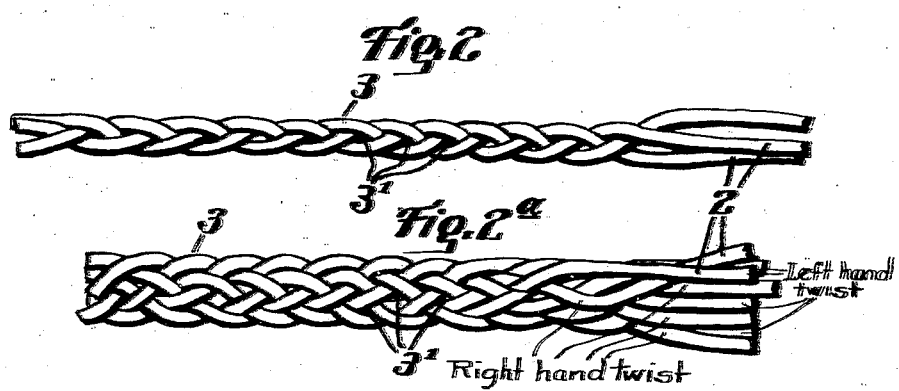
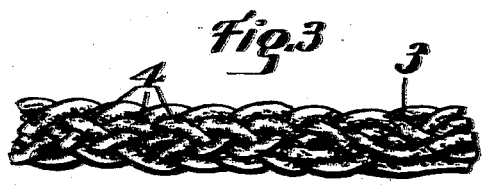
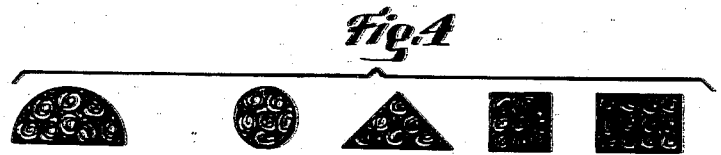
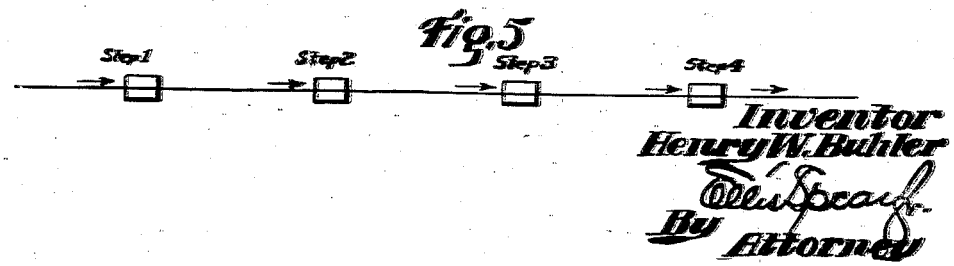
Inventor
Henry W. Buhler
By Attorney Patented Sept. 16, 1930

1,775,668

UNITED STATES PATENT OFFICE

HENRY W. BUHLER, OF GLOUCESTER, MASSACHUSETTS

TRIMMING FOR AUTOMOBILES, FURNITURE, AND THE LIKE

Application filed January 24, 1927. Serial No. 163,078.

This invention relates to a new article of manufacture comprising a fibrous material so shaped and treated as to be capable of use as a molding or trimming in cases where extreme flexibility is required. Such molding or trimming generally comprises a body or core of suitable material covered with a leather, imitation leather or other material casing. Such trimmings are used largely in automobile manufacture as well as in furniture or other upholstered articles.

My invention relates particularly to the core or filler for such molding or trimming which may be so marketed in any desired lengths, shapes and sizes. One desirable qualification of such a core or filler relates to its use as a stuffer or space-filler for a space of predetermined fixed dimensions, such as the interspace of a sewed piping or the channel of a metallic, leather or other strip fitting. Such uses require and demand wholly exact circumferential dimension throughout, with a tolerance for variation of the order of a few thousandths of an inch only, and an equally exact retention of molded shape (especially in relation to the maintenance of fins, edges, corners, and the junctures of chord and arc of round and flat surfaces) strictly parallel with the lengthwise axis of the solid represented by the core or filler. Twisting of the filler core or variance of the circumferential dimension would prevent the completion of the molding or filling either by drawing it into a preformed slot or tubular space, or the making by machinery about the core of a piping or a molding, the dimensions of the interspaces of the piping or molding not being variable. If the uniformity and shape-retaining qualities of the core are not maintained, resort must be to a core of which the maximum dimension only corresponds to the space for it; and this results in failure to maintain the ornamental covering for it everywhere in tight relation to the core, whereas good appearance depends on such relation. Torsion of such a core, either before its insertion or as the result of drawing-in or leading-in tension, is fatal to efficient making of this class of trimmings, requiring undue time and skill in assembling the core and the exterior of the trimming, and often defeating machine assembly operations.

Many kinds of fillers have been produced in the past, including fillers made from fibrous stock such as paper or cotton. It has been difficult, however, to produce a filler which was sufficiently flexible to permit its adaptation to all possible curves or angles of the device on which it was used, without any weakening or disruption of the fibres or deformation of the strip. Rubber and rubber compounds were relatively satisfactory, but expensive. The article disclosed in my copending application, Serial No. 160,927, filed January 13, 1927, is a satisfactory article and an improvement over the prior art. However, it requires the use of a crepe paper which is relatively expensive as compared with the kraft paper which I am able to use in the production of my present trimming filler.

It has been unsatisfactory to use a simple twisted or ropelaid length of paper or other fibrous material because the twisting of the fibres caused an opposed curling tendency which persisted in the finished product. This was very objectionable and could not be overcome even when the trimming was enclosed in a tight casing, and prevented assembly of a preformed core in a preformed space in the trimming strip. By my present invention I am enabled to use ordinary twisted lengths of paper or other fibrous material and yet avoid this curling or rolling tendency.

I employ as a body or base material a uniform soft spun paper twine, preferably made of a constant-width strip of such a uniform high-tensile-strength paper as ordinary kraft paper. This is not only inexpensive but is capable of being spun from a single or laminated strip to form a twine which in turn may be plaited, braided or woven as desired to produce a filler body of reliably constant mass per unit length, assuming, of course, fabrication by plaiting, weaving or braiding as the function of a machine organized for regularity of output, as usual in such machines. It is well known that paper stock may be given a left or right hand twist. I have found that if all the strands used in a trimming filler are twisted in but one direction there may persist an untwisting tendency in the opposite direction even in the finished product; although the braiding operation tends to counterbalance twisting stresses. In order to entirely overcome this tendency, I use in the braiding, where more than three strands are employed, equal numbers of strands twisted right and strands twisted left. This equalization of the twisting tendency is entirely effective when the oppositely twisted strands are used in suitable numbers in a braided or woven structure to prevent a twisted relation in the ultimate strand.

I have shown in the drawings and will describe in the following specification an illustrated embodiment of my invention which I shall discuss particularly in connection with its use as a trimming suitable for use on upholstered furniture or automobile bodies.

Fig. 1 shows a fragment of twisted kraft paper such as I use in my trimming.

Fig. 2 shows three braided strands of such twisted paper.

Fig. 2$^a$ shows such a braiding of a plurality of strands as can be produced by a braiding machine.

Fig. 3 shows the braided strands after they have been treated with cementitious binder.

Fig. 4 discloses representative shapes which may be given the filler after being passed through a forming operation, and Fig. 5 is a diagram showing the various steps in the method of producing my filler.

I provide strips 1 preferably of kraft paper of suitable uniform texture and size depending on the size of cord desired. When these strands of paper have been twisted, folded or otherwise shaped to form a cord as shown at 2 of a suitable form and size with which to work, I select a sufficient number to produce a suitable filler for the purpose in hand. If more than three are used, one half of these cords should have a left hand twist and the other a right hand twist. These cords may be plaited, braided or woven as shown at 3, in Fig. 2$^a$, first a right hand and then a left hand twisted cord being used to equalize the untwisting tendency inherent in the cords. Any number of cords may be used (see Fig. 2$^a$) but the braiding operation always disposes alternate strands in opposite directions, that is, one to the left and the other to the right. This further serves to neutralize any tendency of the twisted strands to curl or roll in either direction. If the strands are woven instead of braided, it will be understood that the warp and woof fibres are substantially at right angles to each other so that no curling or twisting tendency will be found in the finished product.

After the braiding or weaving operation is completed, if desired, the resulting strips 3 may be treated with some flexible cementitious binder 4 such as rubber cement which penetrates the interstices 3$^1$ between the strands 2 and gives an added flexibility to the fibres, although for certain uses my filler is satisfactory without any binder.

The purpose of employing a flexible cementitious binder of the kind mentioned is to increase the capacity of the formed core or filler strip finally produced to retain the effect of a suitable equalizing, shaping or forming operation which will result in everywhere bringing the strip to a uniform cross-sectional area; presupposing, of course, that according to the recommendations of this specification uniformity of the contents of the material in the strip or strand first has been secured. This will be secured by first, uniformity of the spun paper elements in respect to variation from place to place in a unit of length, providing a uniform number of these component strands everywhere in the product, and concatenating them into the preferably braided structure by a regular and uniform braiding operation. For the above purposes the rubber cement is applied in such a way as to interpenetrate the spaces between the component strands both of the braided cover and of the core strands, if any, within the braided cover. In a preferred construction as shown in Fig. 4 tubular braided material may contain one, two or more longitudinal strands each in itself of uniform cross-sectional area.

The treated strips are then shaped by passing the same through formers which may produce by compressive action upon the strip any variety of shape in cross section of the core or filler as illustrated in Fig. 4. The formers squeeze the strip and adhesive impregnant cement, whereby to distribute the impregnant cement uniformly and remove surface excess of cement, as well as to shape the strip.

In the operation of my method as indicated in the diagram, Fig. 5, step 1 consists in the folding or laminating or guiding, and twisting of the strips of paper stock. Step 2 comprises the braiding, plaiting or weaving of the formed cord to produce a filler of sufficient desired body. Step 3 consists in the treatment of this braided, plaited or woven body with a cementitous binder, and step 4 comprises the shaping operation to produce the desired conformation of the treated filler.

Various kinds of base material obviously may be used; and the method of forming the same into a state where a plurality of strands thereof may be joined together to form the filler, the kind and extent of cementitious binder and the way the same is applied to the filler body, as well as the forming operation, may be varied without departing from the spirit of my invention if within the limits of the appended claims.

What I therefore claim and desire to secure by Letters Patent is:

1. Moulded core or filler strand characterized by a shaped cross-sectional area of substantially invariable girth from end to end, said strand comprising component fibrous strands of homogeneous strip material of the same mass from end to end, the fibrous strands being in every unit of length of the same aggregate mass, interlaced together, compressively conformed to each other and the boundaries of said shaped cross-sectional area, and mutually cohered by a cementitious impregnant in substantially the same quantity in each unit length of the strand.

2. Moulded strand material, comprising a braided structure of paper strands each uniform in cross section, an agglutinant impregnating material flexible when set, filling the interstices of the braid-structure, the whole compacted and characterized by uniform quantity of the said materials respectively per unit of length.

3. Moulded strand material comprising a braided structure of paper strands each uniform in cross section, an agglutinant impregnating material, flexible when set, filling the interstices of the braid structure, the whole distorted and moulded by pressure and set in a changed form of uniform cross section, and characterized by uniform quantity of the said materials respectively per unit of length.

4. Moulded core or filler strand comprising component fibrous strands spun from uniform strips of paper and interbraided, substantially equal numbers of said component strands having a left-hand twist and a right-hand twist, respectively, the braided structure being of the kind in which the systems of yarns respectively extend at a similar angle to the direction of length of the braid, said braided structure having its interstices filled with a flexible adhesive impregnant, the core or filler strand so composed being moulded to a uniform non-circular cross-sectional area, the components of said core or filler strand being everywhere aggregated together by said flexible adhesive impregnant.

5. Moulded core or filler strand, consisting of a plurality in equal numbers of right and of left hand twisted strands of kraft paper mutually interbraided, whereby to counterbalance the tendency to torsion under longitudinal stresses related to the direction of twist of the component strands, said strands being cemented together and compressively moulded into a continuous shaped strand unit everywhere of the same cross-section.

6. Core or filler strand characterized by a shaped cross-sectional area substantially invariable in circumferential dimension from end to end, said strand comprising component fibrous strands of homogeneous strip of sheet material of uniform thickness of the same mass from end to end, the fibrous strands being in every unit of length of the same aggregate mass, interlaced together, and compressively conformed to each other and the boundaries of said shaped cross-sectional area.

7. The method of making a core or filler strand which comprises as steps providing spun paper strands of uniform mass per each unit length and respectively spun with a left-hand twist and spun with a right-hand twist, interbraiding said strands in a tubular braid wherein the strands of one kind of twist comprise one system of yarns traveling in one direction and the strands of the other kind of twist comprise another system of yarns traveling in the other direction, impregnating the braid so formed with an adhesive cementitious substance flexible when set, and forming the impregnated strand by compression into a continuous length everywhere of the same cross-sectional area and containing a uniform mass of the fibrous component and a uniform mass of the cementitious impregnant in each unit of length.

8. Method of making a moulded core or filler strand characterized by constant circumferential dimension, flexibility and a non-circular cross-section, comprising as steps forming a solid braid of fibrous strands respectively of uniform mass per unit of length, impregnating the braid with a viscous cementitious flexible binder and shaping the braid and removing the excess of impregnant by pressure in a former to a desired non-circular cross-section.

9. The method of forming a cord member by first forming individual twisted strands of paper, thereafter interengaging the strands into the form of a matted section by braiding them together and permeating the matted section with a binding medium whereby the strands will be brought firmly together while retaining the resiliency of the individual strands, and thereafter rolling the same into semi-oval shape.

10. The method of forming a filler cord having great strength and flexibility by first forming individual strands of paper, thereafter braiding a number of said strands together into a braided cord, permeating said braided cord with a binding medium, and thereafter subjecting the braided impregnated cord to pressure whereby to conform it to a cross section different from its original cross section.

11. Filler cord, having a shaped semi-oval cross section, comprising component braided twisted-paper strands and a cementitious binder in its interstices, the braided strands and binder compressively conformed to each other in said semi-oval cross section.

12. Filler cord, characterized by a shaped non-circular cross section, comprising component braided twisted-paper strands impregnated with a cementitious binder, the braided strands and impregnant compressively conformed to each other in said non-circular cross section.

13. That method of making trimming moulding having great strength and flexibility which comprises as steps preparing strips of paper of substantially uniform width and thickness, twisting each strip to form a strand, associating a plurality of such strands by braiding to form a braided cord, impregnating the cord with a fluid medium containing rubber, and passing the impregnated cord between formers which squeeze the cord and uniformly distribute the impregnant while conforming the cord accurately to a predetermined shape having outer surfaces which meet in a sharply defined line extending longitudinally of the cord.

In testimony whereof I affix my signature.

HENRY W. BUHLER.